US012020006B2

United States Patent
O'Connor et al.

(10) Patent No.: US 12,020,006 B2
(45) Date of Patent: Jun. 25, 2024

(54) SHIM LAYER FOR INTERCEPTING CALLS BETWEEN AN UPPER LAYER AND A LOWER LAYER OF A CONTAINER IMAGE

(71) Applicant: RED HAT, INC., Raleigh, NC (US)

(72) Inventors: Cathal O'Connor, Waterford (IE); Brian Gallagher, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 84 days.

(21) Appl. No.: 17/743,650

(22) Filed: May 13, 2022

(65) Prior Publication Data
US 2023/0367565 A1 Nov. 16, 2023

(51) Int. Cl.
*G06F 9/44* (2018.01)
*G06F 8/41* (2018.01)
*G06F 8/60* (2018.01)
*G06F 8/75* (2018.01)

(52) U.S. Cl.
CPC .................. *G06F 8/41* (2013.01); *G06F 8/60* (2013.01); *G06F 8/75* (2013.01)

(58) Field of Classification Search
CPC .................. G06F 8/41; G06F 8/60; G06F 8/75
USPC ........................................................ 717/140
See application file for complete search history.

(56) References Cited

U.S. PATENT DOCUMENTS 9,519,600 B2 * 12/2016 Lupu ..................... G06F 9/4411
9,898,354 B2 * 2/2018 Engel .................. G06F 9/44536
2013/0283377 A1 10/2013 Das et al.
2021/0390172 A1 12/2021 Kim et al.
2022/0103593 A1 3/2022 Singh et al.
2022/0129539 A1 4/2022 Walsh et al.

FOREIGN PATENT DOCUMENTS

WO 2020106973 A1 5/2020

OTHER PUBLICATIONS

Beede et al., "MyShield: Protecting Mobile Device Data via Security Circles", 2012, Technical Report, University of Colorado Boulder, 14 pages. (Year: 2012).*
Extended European Search Report for EP Application No. 22192326.1 dated May 16, 2023.

(Continued)

*Primary Examiner* — Ted T. Vo
(74) *Attorney, Agent, or Firm* — Kilpatrick Townsend & Stockton LLP

(57) ABSTRACT

A shim layer can be incorporated into a container image for intercepting calls between an upper layer and a lower layer of the container image according to some aspects described herein. For example, a system can build an image file that includes a stacked arrangement of layers configured for deploying a software program within a container. The stacked arrangement of layers can include a lower layer including one or more objects. The stacked arrangement of layers can include an upper layer positioned above the lower layer, where the upper layer includes the software program. And the stacked arrangement of layers can include a shim layer positioned between the lower layer and the upper layer. The shim layer can include a shim, which is configured to intercept calls involving the one or more objects from the software program and responsively allow or reject the calls based on control data.

18 Claims, 6 Drawing Sheets

(56) References Cited

OTHER PUBLICATIONS

Ghavamnia et al., "Confine: Automated System Call Policy Generation for Container Attack Surface Reduction", http://www.usenix.org/system/files/raid20-ghavamnia.pdf, Oct. 8, 2020; pp. 443-458.
Huamin, Tang, "Getting Started with Kubernetes | Further Analysis of Linux Containers," Alibaba Cloud Community, 2020, pp. 1-18.
Velichko, Ivan, "How Docker Build Works Internally," https://iximiuz.com/en/posts, 2020, pp. 1-20.
Saurav, "Design your interface—with a "shim" layer," 2016, p. 1.
Teske, Lucas, "Linux shim for Patching executable in run-time." https://lucasteske.medium.com, 2017, pp. 1-13.
Marcho, Craig, "Demystifying Shims—or—Using the App Compat Toolkit to make your old stuff work with your new stuff." Microsoft Tech Community, Mar. 16, 2019, pp. 1-9.
Velichko, Ivan "Journey From Containerization To Orchestration And Beyond," https://iximiuz.com/en/posts, Aug. 18, 2019 (updated: Sep. 3, 2021), pp. 1-21.

\* cited by examiner

SHIM LAYER FOR INTERCEPTING CALLS BETWEEN AN UPPER LAYER AND A LOWER LAYER OF A CONTAINER IMAGE

TECHNICAL FIELD

The present disclosure relates generally to building container images. More specifically, but not by way of limitation, this disclosure relates to incorporating a shim layer into a container image, where the shim layer is configured to intercept calls between an upper layer and a lower layer of the container image.

BACKGROUND

Software programs such as applications and microservices can be deployed inside containers. A container is a relatively isolated virtual environment created by leveraging the resource isolation features (e.g., cgroups and namespaces) of the Linux Kernel. Deploying software programs inside containers can help isolate the software programs from one another and provide other benefits.

Containers are deployed from image files using a container engine, such as Docker®. These image files are often referred to as container images. A container image can be conceptualized as a stacked arrangement of layers in which a base layer is positioned at the bottom and other layers are positioned above the base layer. The base layer may include operating system files for deploying a guest operating system inside the container. The guest operating system may be different from the underlying host operating system of the physical machine on which the container is deployed. The other layers may include a target software program and its dependencies, such as its libraries, binaries, and configuration files. The target software program may be configured to run (e.g., on the guest operating system) within the isolated context of the container.

DETAILED DESCRIPTION

Figure 1:
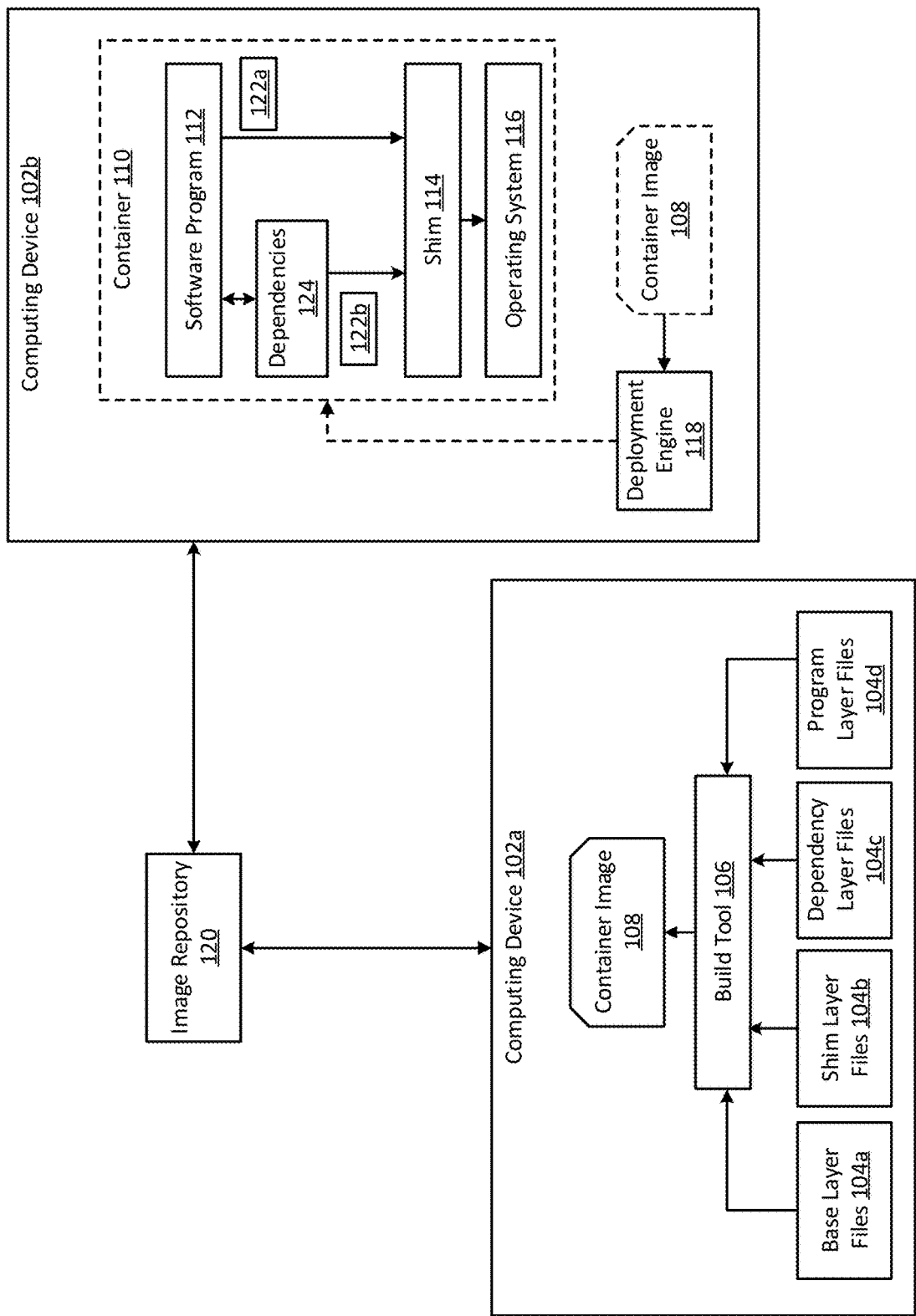
FIG. 1 is a block diagram of an example of a system for building a container image with a shim layer according to some aspects of the present disclosure.

A container image may be designed to deploy a target software program in a computing environment. To help support the target software program, the container image may include dozens or hundreds of libraries, binaries, and other files on which the target software may depend at runtime. But some of those dependencies may have vulnerabilities that can be exploited by malicious entities (e.g., computer hackers). In some cases, the vulnerable dependencies may exist in the base layer of the container image because the base layer may include a relatively large number of files and may be updated relatively infrequently. For example, the base layer may store the operating system files used to deploy a particular operating system within the container. Developers may intentionally store a larger number of files in the base layer, so that the base layer can be used as the foundation for multiple different container images. This over-inclusivity means that the base layer may store many extraneous files that are not needed by the target software application. While this over-inclusivity provides advantages for building container images, it may unnecessarily expose a large number of attack vectors, particularly when the target software program only requires a small subset of the base layer files to properly function. Other layers of the container image may also include vulnerable files that may raise security concerns.

Within the limited subset of container image files that are actually used by the target software program, it may also be that only certain subparts of those files (e.g., certain functions) are used by the target software program. The remaining portions of those files may therefore be extraneous. The presence of those extraneous file portions in the container image may also expose additional attack vectors to malicious entities, which can create an unnecessary security risk.

Some examples of the present disclosure can overcome one or more of the abovementioned problems by incorporating a shim layer between a lower layer and an upper layer of a container image, where the shim layer includes a shim that can transparently intercept calls from the upper layers to the lower layers of the container image. A shim can be a daemon, library, or another relatively small piece of software that sits between two layers of software to intercept communications between the software and perform corresponding actions. The shim can determine whether the intercepted calls are permissible or impermissible based on predefined control data. The shim can then allow permissible calls and deny impermissible calls. Because the control data can be configured to only allow certain (e.g., required) calls from the upper layers to the lower layers, all other extraneous calls to the lower layers may be rejected by the shim. This may prevent a malicious actor from taking advantage of the extraneous content in the lower layers. For example, a malicious actor may try to manipulate one of the files in an upper layer into issuing a modified call to a lower layer, with the goal of exploiting an object in the lower layer. But, the shim layer may rejected such a call and thereby prevent successful exploitation of the object.

The shim layer may be positioned between any two layers of the container image. Any layer below the shim layer within the stacked arrangement of layers can be referred to as a lower layer, and any layer above the shim layer in the stacked arrangement of layers can be referred to as an upper layer. The shim layer can intercept calls from the upper layers to the lower layers, determine whether they are permissible or impermissible based on the control data, and allow or reject the calls accordingly. Intercepting calls from the upper layers to the lower layers may involve intercepting calls from software associated with the upper layers to other software associated with the lower layers.

As one particular example, the container image can include an upper layer with a target software program, a base layer with an operating system, and a shim layer positioned between the upper layer and the base layer. The shim layer can include a shim configured to intercept operating system calls from the target software program to the operating system. The shim can allow or deny the calls based on the control data. This may prevent a malicious actor from exploiting operating system in the base layer.

In some examples, the control data may be generated by analyzing the source code for the target software program. For example, an analyzer tool can automatically analyze the source code to determine which calls may be issued by the target software program during execution. The analyzer tool may also analyze the source code of the dependencies (on which the target software program relies) to determine which calls may be issued by the dependencies to facilitate execution of the target software program. The analyzer tool can then generate the control data based on the results of this analysis. The control data can be configured to allow the identified calls and deny all other calls. For example, the analyzer tool can include a list of permissible calls in the control data. The shim can then compare calls issued by the target software program and its dependencies to the list to determine the validity of the calls. Calls on the list may be deemed valid and allowed. Calls not on the list may be deemed invalid and rejected.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for building a container image 108 with a shim layer according to some aspects of the present disclosure. The system includes a computing device 102a, such as a laptop computer, desktop computer, or server. The computing device 102a can include a build tool 106 for building a container image 108 having a stacked arrangement of layers. One example of the build tool 106 may be Docker®. A software developer can operate the build tool 106 to generate a container image 108 that may be specifically configured for deploying a particular software program 112 within a container 110. Examples of the software program 112 can include a microservice, serverless function, or software application.

As part of the build process, the build tool 106 may receive metadata associated with building the container image 108 (e.g., a Dockerfile containing a list of commands for assembling the image). The metadata can indicate which layers are to be incorporated into the container image 108 and how they are to be arranged in the container image 108. The build tool 106 may also receive files 104a-d for the corresponding layers. For example, the build tool 106 may receive base layer files 104a for a base layer of the container image 108. In the example shown in FIG. 1, base layer files 104a include operating system files for deploying an operating system 116 in a container 110 at runtime. But in other examples, the base layer files 104a may additionally or alternatively include other types of files. The build tool 106 may also receive shim layer files 104b for a shim layer of the container image 108. The shim layer files (e.g., libraries, binaries, and control data) may be configured for deploying a shim 114 in the container 110 at runtime. The build tool 106 may also receive dependency layer files 104c for one or more intermediate layers of the container image 108. The dependency layer files 104c may include one or more dependencies 124 on which the software program 112 may rely at runtime. Examples of the dependencies 124 can include libraries, binaries, and configuration files. The build tool 106 may also receive program layer files 104d for a program layer of the container image 108. The program layer files 104d may be configured for deploying the software program 112 in the container 110 at runtime.

Based on the files 104a-d and the metadata, the build tool 106 can construct the container image 108. The computing device 102a may then make the container image 108 available to another computing device 102b for deployment thereon. For example, the other computing device 102b may be operated by an end user of the software program 112. A developer may operate the computing device 102a to generate the container image 108 and upload the container image 108 to an image repository 120, which can store one or more container images for end users. The computing device 102a can upload the container image 108 to the image repository 120 via a network, such as a local area network or the Internet. Once the container image 108 is stored in the image repository 120, the end user may be able to download the container image 108 to the computing device 102b from the image repository 120. The end user may then deploy the container 110 on the computing device 102b using a deployment engine 118, such as Docker®. Of course, the container 110 may additionally or alternatively be deployed on the computing device 102a in some examples.

Once deployed, the container 110 may include the software program 112, the dependencies 124, the shim 114, and the operating system 116. The software program 112, dependencies 124, and the shim 114 can run on the operating system 116. The operating system 116 can be a guest operating system that is different from the underlying operating system of the computing device 102b.

As the software program 112 executes, it may issue calls 122 to objects in the lower layers of the container image 108. The calls 122 may be directed to the operating system 116 or other objects in the lower layers. Calls issued to an operating system 116 can be referred to as operating system calls. The dependencies 124 may also issue calls 122b at the behest of the software program 112. Those calls 122b may also be directed to the operating system 116 or other objects in the lower layers. In some examples, the calls 122a-b may be application program interface (API) calls or other types of calls. The calls 122a-b may be function calls configured for causing the call recipient (e.g., the operating system 116 or another object) to execute a function and return a result. In some examples, the calls 122a-b may include various parameters, such as a name and arguments, that dictate how the call recipient is to execute the function and the way in which results are to be returned.

The shim 114 can intercept the calls 122a-b. In some examples, the calls 122a-b may be transparently intercepted by the shim 114. A call can be "transparently intercepted" if the source (e.g., the software program 112 or the dependencies 124) of the call is unaware that the call was intercepted. In response to intercepting each of the calls 122a-b, the shim 114 can determine whether to allow or reject the call based on control data. The control data may be predefined and stored in the shim layer files 104b or elsewhere in the container image 108. Based on these determinations, the shim 114 may then allow or reject the calls accordingly.

Figure 2:
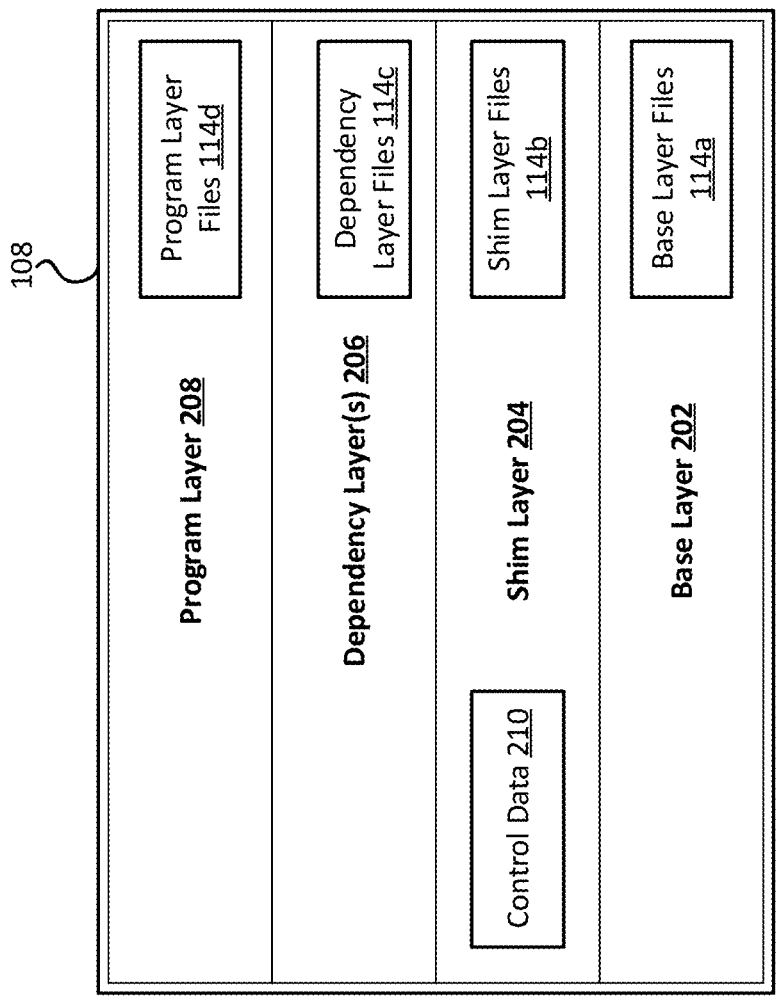
FIG. 2 is a block diagram of an example of a container image with a shim layer according to some aspects of the present disclosure.

FIG. 2 is a block diagram of an example of a container image 108 with a shim layer 204 according to some aspects of the present disclosure. As shown, the container image 108 can be conceptualized as a stacked arrangement of layers. In this example, the base layer 202 is positioned at the bottom of the stack in the container image 108. Above the base layer 202 is the shim layer 204. Above the shim layer 204 is one or more dependency layers 206. And above the one or more dependency layers 206 is a program layer 208. In this configuration, the program layer 208 and the dependency layers can be considered upper layers, because they are positioned above the shim layer 204. Conversely, the base layer 202 can be considered a lower layer 214, because it is positioned below the shim layer 204. The dependency layers 206 and the shim layer 204 may also be considered intermediate layers, because they are positioned beneath the upper-most layer (e.g., the program layer 208) and the lower-most layer (e.g., the base layer 202) of the container image 108. But the specific configuration shown in FIG. 2 is intended to be illustrative and non-limiting. Other examples may involve a different configuration of the layers 202-208. For instance, another example may involve the shim layer 204 being positioned above the dependency layers 206 and below the program layer 208. In such an arrangement, the dependency layers 206 and the base layer 202 can be considered lower layers.

As noted above, the program layer 208 can include the program files 114*d* configured for deploying the software program 112 in the container 110 at runtime. The dependency layers 206 may include dependency layer files 104*c* for dependencies 124 of the software program 112. The base layer 202 may include operating system files and/or other types of base layer files 114*a*. The shim layer 204 may include the shim layer files 114*b* for deploying the shim 114.

In some examples, the shim layer 204 can also include control data 210. The control data 210 may include a list of permissible calls, a list of impermissible calls, or a combination of these. The control data 210 may be generated manually by a developer or using an automated process, as described later on with respect to FIG. 4. The shim 114 can evaluate each incoming call against the control data 210 to determine whether the call should be rejected or allowed. In this way, the control data 210 can serve as a security policy for issued calls.

Figure 3:
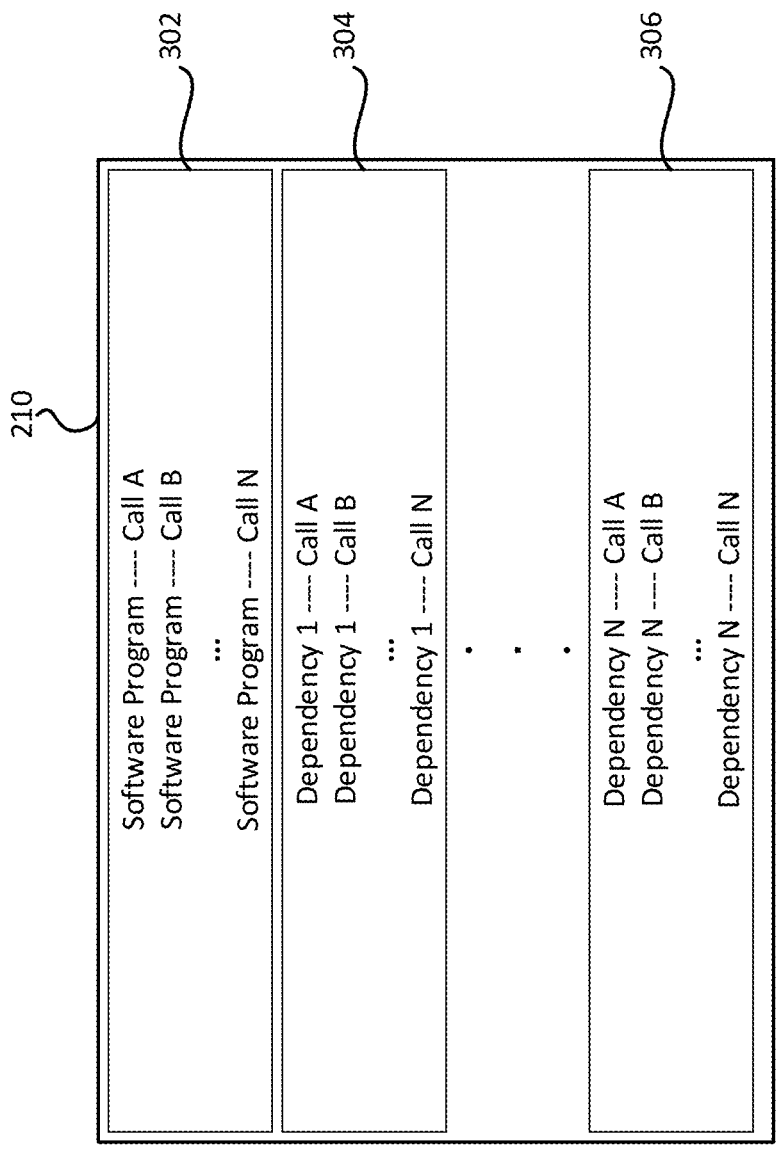
FIG. 3 is a block diagram of an example of control data according to some aspects of the present disclosure.

One example of the control data 210 is shown in FIG. 3. In this example, the control data 210 includes a first list 302 of permissible calls from the software program 112, a second list 304 of permissible calls from one of the dependencies of the software program 112, and an $N^{th}$ list 306 of permissible calls from an $N^{th}$ dependency of the software program 112. Each of the lists 302-306 may include any number and combination of software calls. While the lists 302-306 in FIG. 3 indicate permissible software calls, in other examples the lists 302-306 may specify impermissible software calls rather than, or in addition to, the permissible software calls.

Figure 4:
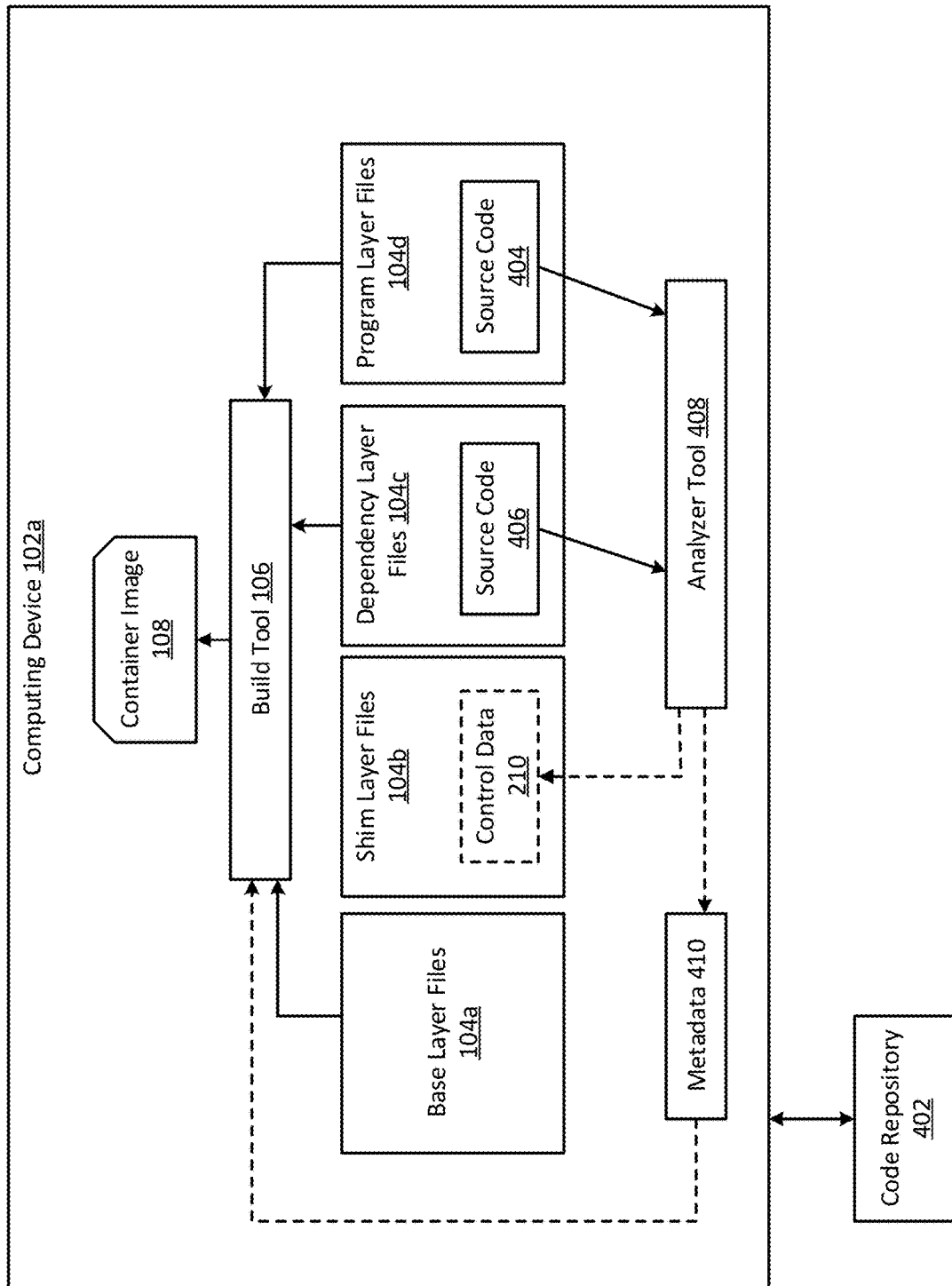
FIG. 4 is a block diagram of an example of a system for generating control data according to some aspects of the present disclosure.

FIG. 4 shows a block diagram of an example of a system for generating the control data 210 according to some aspects of the present disclosure. The system includes an analyzer tool 308, which is software executable on the computing device 102*a*. In some examples, the analyzer tool 308 may be part of a compiler usable to translate source code into machine code (e.g., a binary file).

The analyzer tool 408 can receive source code 404 for the software program 112 as input. The analyzer tool 408 may receive the source code 404 from the program layer files 104*d*, a code repository 402, or from another location. The code repository 402 may be accessible to the analyzer tool 408 via a network, such as the Internet. The analyzer tool 408 can then analyze the source code 404 to identify calls that the software program 112 may make during operation. Analyzing the source code 404 can include parsing through the source code 404 to identify calls involving (e.g., directed to) one or more restricted objects. A restricted object can be an object in a lower container layer that is protected by the shim layer, such as an object in the base layer of the container image 108. Examples of an object can include a file, library, or process. After identifying the calls, the analyzer tool 408 can generate the control data 210 based on the identified calls, for example by adding the identified calls to a list in the control data 210.

In some examples, the analyzer tool 408 may parse through the source code 404 to identify dependencies of the software program 112. These dependencies can be referred to as direct dependencies of the software program 112. The analyzer tool 408 may further analyze the direct dependencies to determine their dependencies, which may be considered indirect dependencies of the software program 112. For example, the analyzer tool 408 can recursively analyze the source code 406 for the direct dependencies and indirect dependencies of the software program 112 to develop a dependency tree for the software program 112. The analyzer tool 408 may receive the source code 406 from the dependency layer files 104*c*, the code repository 402, or from another location. Once the dependencies (e.g., direct and indirect) for the software program 112 have been identified, the analyzer tool 408 can analyze them to identify calls involving restricted objects. For example, the software program 112 can analyze the source code 406 for the dependencies to identify the calls. The analyzer tool 408 can then generate the control data 210 based on the identified calls, for example by adding the identified calls to a corresponding list in the control data 210. In this way, the control data 210 can be generated to include a list of permissible calls from both the software program 112 itself and its dependencies.

Once the control data 210 has been generated, it can be incorporated into the container image 108 for use by the shim 114, as described above. For example, the control data 210 can be incorporated into the shim layer files 104*b* for inclusion in the container image 108. In some examples, the analyzer tool 408 can cause the control data 210 to be incorporated into the container image 108 by generating metadata 410 (e.g., a Dockerfile or a manifest file) based on the control data 210, where the metadata 410 is configured for use in the build process. The metadata 410 can specify a location of the control data 210 and indicate where the control data 210 is to be incorporated into the container image 108. The metadata 410 can then be input to the build tool 106, which can incorporate the control data 210 into the container image 108 based on the metadata 410.

Figure 5:
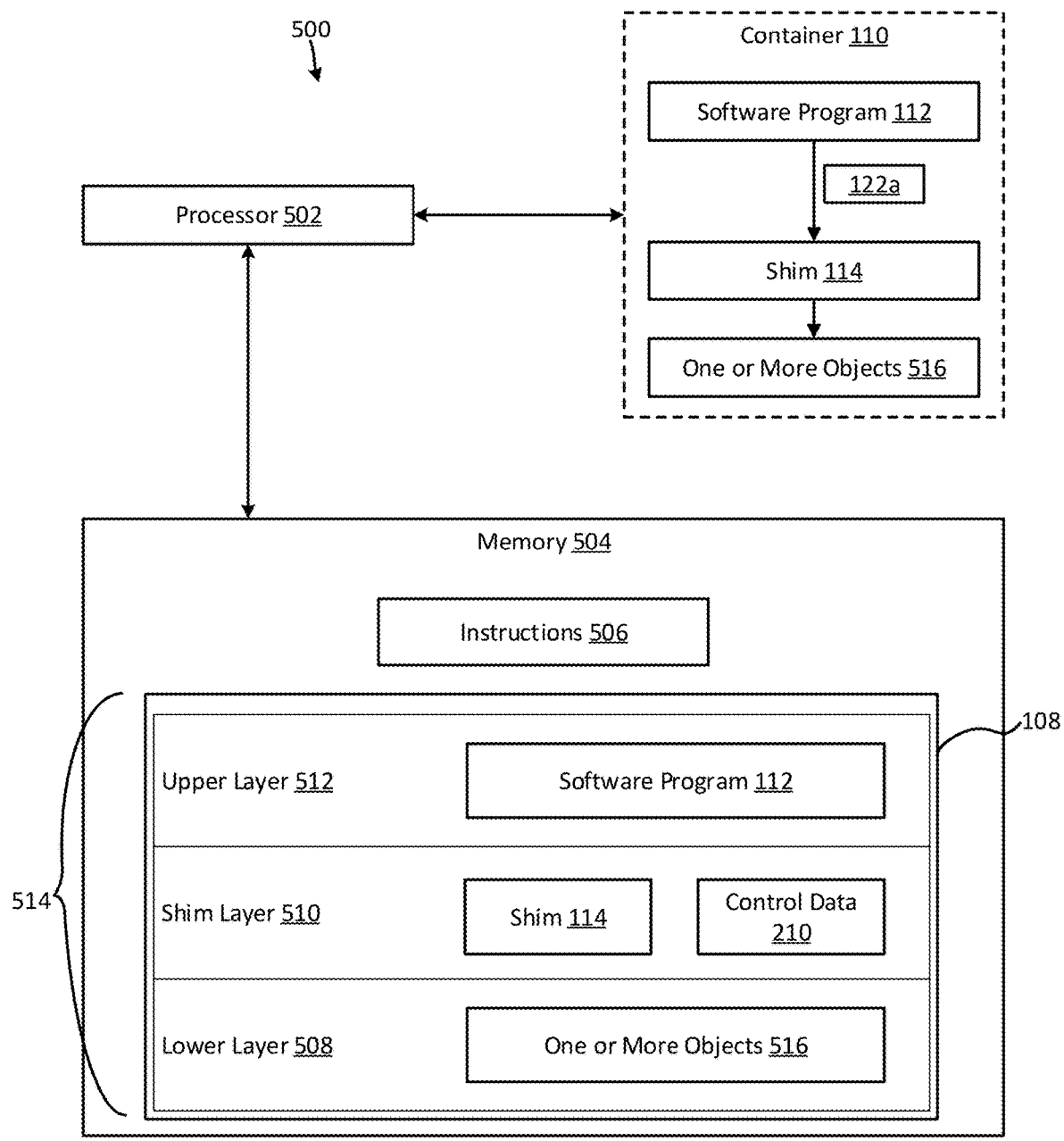
FIG. 5 is a block diagram of an example a system according to some aspects of the present disclosure.

FIG. 5 is a block diagram of an example a system 500 according to some aspects of the present disclosure. The system 500 includes a processor 502 communicatively coupled to a memory 504. In some examples, the processor 502 and the memory 504 may be parts of the same computing device, such as computing device 102*a*. In other examples, the processor 502 and the memory 504 can be distributed (e.g., in separate housings) and remote from one another.

The processor 502 can include one processing device or multiple processing devices. Examples of the processor 502 include a Field-Programmable Gate Array (FPGA), an application-specific integrated circuit (ASIC), and a microprocessor. The processor 502 can execute instructions 506 stored in the memory 504 to perform operations. The instructions 506 may include processor-specific instructions generated by a compiler or an interpreter from code written in any suitable computer-programming language, such as C, C++, C #, and Java.

The memory 504 can include one memory device or multiple memory devices. The memory 504 can be volatile or non-volatile in that retains stored information when powered off. Examples of the memory 504 include electrically erasable and programmable read-only memory (EE- PROM), flash memory, or any other type of non-volatile memory. At least some of the memory 504 can include a non-transitory computer-readable medium from which the processor 502 can read instructions 506. A computer-readable medium can include electronic, optical, magnetic, or other storage devices capable of providing the processor 502 with computer-readable instructions or other program code. Examples of a computer-readable medium include magnetic disks, memory chips, ROM, random-access memory RAM, an ASIC, a configured processor, optical storage, or any other medium from which a computer processor can read the instructions 506.

In some examples, the processor 502 can execute the instructions 506 to perform operations. For example, the processor 502 can build an image file 108 that includes a stacked arrangement of layers 514 configured for deploying a software program 112 within a container 110. The stacked arrangement of layers 514 can include a lower layer 508 including one or more objects 516, such as libraries, binaries, and other files. The stacked arrangement of layers 514 can also include an upper layer 512 positioned above the lower layer 508. The upper layer 512 can include the software program 112. The stacked arrangement of layers 514 can further include a shim layer 510 positioned between the lower layer 508 and the upper layer 512. The shim layer 510 can include a shim 114 configured to intercept calls 122, involving the one or more objects 516, from the software program 112. The shim 114 can allow or reject the calls 122 based on control data 210.

Figure 6:
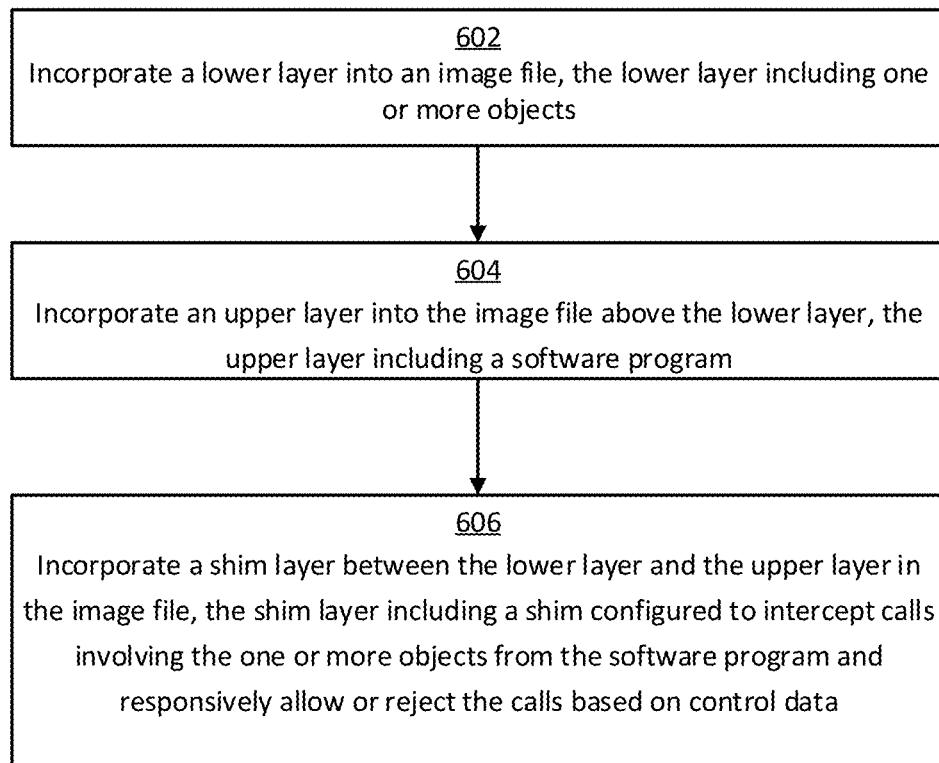
FIG. 6 is a flow chart of an example of a process for building a container image with a shim layer according to some aspects of the present disclosure.

FIG. 6 is a flow chart of an example of a process for building a container image with a shim layer according to some aspects of the present disclosure. Other examples may include more operations, fewer operations, different operations, or a different order of the operations than is shown in FIG. 6. The operations of FIG. 6 are described below with reference to the components of FIG. 5 above. In general, the process shown in FIG. 6 relates to building an image file 108 that includes a stacked arrangement of layers 514 configured for deploying a software program 112 in a container 110.

In block 602, a processor 502 incorporates a lower layer 508 into an image file 108, where the lower layer 508 can include one or more objects 516. Incorporating the lower layer 508 into the image file 108 may involve including a first set of files (e.g., base layer files 104a) associated with the lower layer 508 into the image file 108. Incorporating the lower layer 508 into the image file 108 may also involve designating the first set of files as belonging to the lower layer 508 in metadata of the image file 108. An example of the metadata can include a manifest file.

In block 604, the processor 502 incorporates an upper layer 512 into the image file 108 above the lower layer 508. The upper layer 512 may include a software program 112 that is to be deployed inside a container 110. Incorporating the upper layer 512 into the image file 108 may involve incorporating a second set of files (e.g., program layer files 104d) associated with the upper layer 512 into the image file 108. Incorporating the upper layer 512 into the image file 108 may also involve designating the second set of files as belonging to the upper layer 512 in the metadata of the image file 108.

In block 606, the processor 502 incorporates a shim layer 510 between the lower layer 508 and the upper layer 512 in the image file 108. The shim layer 510 can include a shim 114 that is executable inside the container 110. The shim 114 can be configured to intercept calls 122a from the software program 112, where the calls 122a involve the one or more objects 516, and responsively allow or reject the calls 122a based on control data 210. The control data 210 may be stored in the shim layer 510 or elsewhere in the image file 108. The shim 114 can extract the control data 210 from a control file for use in validating the calls 122a.

Incorporating the shim layer 510 into the image file 108 may involve incorporating a third set of files (e.g., shim layer files 104b) associated with the shim layer 510 into the image file 108. Incorporating the shim layer 510 into the image file 108 may also involve designating the third set of files as belonging to the shim layer 510 in the metadata of the image file 108.

In some aspects, a shim layer for intercepting calls between an upper layer and a lower layer of a container image can be implemented according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to build an image file that includes a stacked arrangement of layers configured for deploying a software program within a container. The stacked arrangement of layers can include a lower layer including one or more objects; an upper layer positioned above the lower layer, the upper layer including the software program; and a shim layer positioned between the lower layer and the upper layer, the shim layer including a shim configured to intercept calls involving the one or more objects from the software program and responsively allow or reject the calls based on control data.

Example #2: The non-transitory computer-readable medium of Example #1, further comprising program code that is executable by the processor for causing the processor to: generate the control data by analyzing source code for the software program; and store the control data in the image file.

Example #3: The non-transitory computer-readable medium of Example #2, further comprising program code that is executable by the processor for causing the processor to: analyze the source code for the software program to identify calls involving the one or more objects; and generate the control data based on the calls identified in the source code Example #4: The non-transitory computer-readable medium of Example #3, wherein the identified calls constitute permissible calls, wherein the control data includes a list of the permissible calls, and wherein the shim is configured to allow the permissible calls and reject all other calls involving the one or more objects.

Example #5: The non-transitory computer-readable medium of any of Examples #1-4, wherein the control data includes a list of impermissible calls, the shim being configured to reject the impermissible calls and allow all other calls involving the one or more objects.

Example #6: The non-transitory computer-readable medium of any of Examples #1-5, wherein the stacked arrangement of layers includes an intermediate layer positioned between the lower layer and the upper layer, the intermediate layer including one or more dependencies for the software program, and the shim being configured to intercept one or more calls involving the one or more objects from the dependencies and responsively allow or reject the one or more calls based on the control data.

Example #7: The non-transitory computer-readable medium of Example #6, further comprising program code that is executable by the processor for causing the processor to generate the control data by analyzing source code for the one or more dependencies.

Example #8: The non-transitory computer-readable medium of any of Examples #1-7, further comprising program code that is executable by the processor for causing the processor to deploy the container within a computing environment using the image file, the container including the one or more objects, the software program, and the shim.

Example #9: The non-transitory computer-readable medium of any of Examples #1-8, wherein the shim is configured to operate transparently to the software program.

Example #10: The non-transitory computer-readable medium of any of Examples #1-9, wherein the control data is stored in the shim layer, and wherein the one or more objects include an operating system inside the container.

Example #11: A computer-implemented method, comprising: building an image file that includes a stacked arrangement of layers configured for deploying a software program within a container, wherein building the image file includes: incorporating a lower layer into the image file, the lower layer including one or more objects; incorporating an upper layer into the image file above the lower layer, the upper layer including the software program; and incorporating a shim layer between the lower layer and the upper layer in the image file, the shim layer including a shim configured to intercept calls involving the one or more objects from the software program and responsively allow or reject the calls based on control data.

Example #12: The method of Example #11, further comprising, prior to building the image file: generating the control data by analyzing source code for the software program.

Example #13: The method of Example #12, wherein the lower layer is a base layer and the one or more objects include an operating system of the container, and further comprising: analyzing the source code for the software program to identify operating system calls in the source code; and generating the control data based on the operating system calls identified in the source code.

Example #14: The method of Example #13, wherein the operating system calls constitute permissible calls, wherein the control data includes a list of the permissible calls, and wherein the shim is configured to allow the permissible calls and reject all other calls associated with the software program to the operating system.

Example #15: The method of any of Examples #11-14, wherein the control data includes a list of impermissible calls, the shim being configured to reject the impermissible calls and allow all other calls associated with the software program involving the one or more objects.

Example #16: The method of any of Examples #11-15, wherein the stacked arrangement of layers includes an intermediate layer positioned between the lower layer and the upper layer, the intermediate layer including one or more dependencies for the software program, and the shim being configured to intercept one or more calls involving the one or more objects from the dependencies and responsively allow or reject the one or more calls based on the control data.

Example #17: The method of Example #16, further comprising generating the control data by analyzing source code for the one or more dependencies.

Example #18: The method of any of Examples #11-17, further comprising deploying the container within a computing environment using the image file, the container including the one or more objects, the software program, and the shim.

Example #19: The method of any of Examples #11-18, wherein the calls include application programming interface (API) calls.

Example #20: A system comprising: one or more processors; and a memory including instructions that are executable by the one or more processors for causing the one or more processors to build an image file that includes a stacked arrangement of layers configured for deploying a software program within a container, the stacked arrangement of layers including: a lower layer including one or more objects; an upper layer positioned above the lower layer, the upper layer including the software program; and a shim layer positioned between the lower layer and the upper layer, the shim layer including a shim configured to intercept calls involving the one or more objects from the software program and responsively allow or reject the calls based on control data.

Example #21: A non-transitory computer-readable medium comprising an image file that includes a stacked arrangement of layers configured for deploying a software program within a container, the stacked arrangement of layers including: a base layer including an operating system for the container; an upper layer positioned above the base layer, the upper layer including the software program; and a shim layer positioned between the base layer and the upper layer, the shim layer including a shim configured to intercept calls from the software program to the operating system and responsively allow or reject the calls based on control data.

Example #22: The non-transitory computer-readable medium of Example #21, wherein the shim layer includes the control data.

Example #23: A system comprising: one or more processors; and a memory including instructions that are executable by the one or more processors for causing the one or more processors to: receive an image file for deploying a container in a computing environment, the image file including a shim layer positioned between a base layer and an upper layer of the image file; and deploy the container in the computing environment using the image file, the container including: an operating system defined by the base layer; a software program defined by the upper layer; and a shim defined by the shim layer, the shim being configured to intercept calls from the software program to the operating system and responsively allow or reject the calls based on control data.

Example #24: The system of Example #23, wherein the control data is stored in the image file.

Example #25: The system of Example #24, wherein the control data is stored in the shim layer.

Example #26: The system of any of Examples #23-25, wherein the control data includes a list of permissible calls, and wherein the shim is configured to allow the permissible calls and reject all other calls from the software program.

Example #27: The system of any of Examples #23-26, wherein the calls include application program interface (API) calls.

Example #28: A method comprising: receiving, by one or more processors, an image file for deploying a container in a computing environment, the image file including a shim layer positioned between a base layer and an upper layer of the image file; and deploying, by the one or more processors, the container in the computing environment using the image file, the container including: an operating system defined by the base layer; a software program defined by the upper layer; and a shim defined by the shim layer, the shim being configured to intercept calls from the software program to the operating system and responsively allow or reject the calls based on control data.

Example #29: The method of Example #28, wherein the control data is stored in the image file.

Example #30: The method of Example #29, wherein the control data is stored in the shim layer.

Example #31: The method of any of Examples #28-30, wherein the control data includes a list of permissible calls, and wherein the shim is configured to allow the permissible calls and reject all other calls from the software program.

Example #32: The method of any of Example #28-31, wherein the calls include application programming interface (API) calls.

Example #33: A system comprising: means for building an image file that includes a stacked arrangement of layers configured for deploying a software program within a container, the stacked arrangement of layers including: a base layer including an operating system for the container; an upper layer positioned above the base layer, the upper layer including the software program; and a shim layer positioned between the base layer and the upper layer, the shim layer including a shim configured to intercept calls from the software program to the operating system and responsively allow or reject the calls based on control data.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by a processor for causing the processor to build an image file that includes a stacked arrangement of layers configured for deploying a software program within a container, the stacked arrangement of layers including:
    a lower layer including one or more objects;
    an upper layer positioned above the lower layer, the upper layer including the software program;
    an intermediate layer positioned between the lower layer and the upper layer, the intermediate layer including one or more dependencies for the software program; and
    a shim layer positioned between the lower layer and the upper layer, the shim layer including a shim configured to intercept one or more calls involving the one or more objects from the one or more dependencies and responsively allow or reject the one or more calls based on control data.

2. The non-transitory computer-readable medium of claim 1, further comprising program code that is executable by the processor for causing the processor to:
    generate the control data by analyzing source code for the software program; and
    store the control data in the image file.

3. The non-transitory computer-readable medium of claim 2, further comprising program code that is executable by the processor for causing the processor to:
    analyze the source code for the software program to identify calls involving the one or more objects; and
    generate the control data based on the calls identified in the source code.

4. The non-transitory computer-readable medium of claim 3, wherein the identified calls constitute permissible calls, wherein the control data includes a list of the permissible calls, and wherein the shim is configured to allow the permissible calls and reject all other calls involving the one or more objects.

5. The non-transitory computer-readable medium of claim 1, wherein the control data includes a list of impermissible calls, the shim being configured to reject the impermissible calls and allow all other calls involving the one or more objects.

6. The non-transitory computer-readable medium of claim 1, further comprising program code that is executable by the processor for causing the processor to generate the control data by analyzing source code for the one or more dependencies.

7. The non-transitory computer-readable medium of claim 1, further comprising program code that is executable by the processor for causing the processor to deploy the container within a computing environment using the image file, the container including the one or more objects, the software program, and the shim.

8. The non-transitory computer-readable medium of claim 1, wherein the shim is configured to operate transparently to the software program.

9. The non-transitory computer-readable medium of claim 1, wherein the control data is stored in the shim layer, and wherein the one or more objects include an operating system inside the container.

10. A computer-implemented method comprising:
    building an image file that includes a stacked arrangement of layers configured for deploying a software program within a container, wherein building the image file includes:
        incorporating a lower layer into the image file, the lower layer including one or more objects;
        incorporating an upper layer into the image file above the lower layer, the upper layer including the software program;
        incorporating an intermediate layer positioned between the lower layer and the upper layer, the intermediate layer including one or more dependencies for the software program; and
        incorporating a shim layer between the lower layer and the upper layer in the image file, the shim layer including a shim configured to intercept one or more calls involving the one or more objects from the one or more dependencies and responsively allow or reject the one or more calls based on control data.

11. The method of claim 10, further comprising, prior to building the image file:
    generating the control data by analyzing source code for the software program.

12. The method of claim 11, wherein the lower layer is a base layer and the one or more objects include an operating system of the container, and further comprising:
    analyzing the source code for the software program to identify operating system calls in the source code; and
    generating the control data based on the operating system calls identified in the source code.

13. The method of claim 12, wherein the operating system calls constitute permissible calls, wherein the control data includes a list of the permissible calls, and wherein the shim is configured to allow the permissible calls and reject all other calls associated with the software program to the operating system.

14. The method of claim 11, wherein the control data includes a list of impermissible calls, the shim being configured to reject the impermissible calls and allow all other calls associated with the software program involving the one or more objects.

15. The method of claim 10, further comprising generating the control data by analyzing source code for the one or more dependencies.

16. The method of claim 10, further comprising deploying the container within a computing environment using the image file, the container including the one or more objects, the software program, and the shim.

17. The method of claim 10, wherein the calls include application programming interface (API) calls.

18. A non-transitory computer-readable medium comprising an image file that includes a stacked arrangement of layers configured for deploying a software program within a container, the stacked arrangement of layers including:
  a lower layer including one or more objects;
  an upper layer positioned above the lower layer, the upper layer including the software program;
  an intermediate layer positioned between the lower layer and the upper layer, the intermediate layer including one or more dependencies for the software program; and
  a shim layer positioned between the lower layer and the upper layer, the shim layer including a shim configured to intercept one or more calls involving the one or more objects from the one or more dependencies and responsively allow or reject the one or more calls based on control data.

* * * * *